United States Patent Office 3,012,984
Patented Dec. 12, 1961

3,012,984
POLYURETHANE COMPOSITION PREPARED BY REACTING EPOXIDE RESIN POLYESTER AND TRIMETHYLOL PROPANE DIISOCYANATE REACTION PRODUCT IN SOLVENT THEREFOR
George A. Hudson, New Martinsville, W. Va., assignor to Mobay Chemical Company, Pittsburgh, Pa., a corporation of Delaware
No Drawing. Filed Aug. 14, 1958, Ser. No. 754,937
2 Claims. (Cl. 260—31.2)

This invention relates generally to new polyurethane coating compositions and more particularly to a novel polyurethane primer coating composition and to a method for making it.

Heretofore, polyurethane coating compositions have been used successfully to coat a variety of surfaces. These coatings provide a good protective film on the surface which is coated. Metals, wood, concrete, and the like have been coated successfully in this manner. However, polyurethane coatings up to this time have been produced by a two-component system. A two-component system is one in which the reactants which form the system must be kept apart until immediately before use in order to avoid premature chemical reaction. In the case of polyurethane coatings, the polyhydroxyl component cannot be mixed with the polyisocyanate component until immediately before use of the resulting mixture. The reaction between the polyhydroxyl compound and the isocyanate takes place very rapidly so that if the two components are mixed, the resulting mixture must be used right away or else the mixture will set up on standing even at room temperature.

Epoxides or resinous condensation products of a bisphenol and an epihalogenohydrin have also been used like the polyurethanes for coating compositions and such coatings have been found to be very satisfactory. However, the epoxides are likewise a two-component system. It has not been possible to use the epoxides with advantage in a one component system with curing agents present in the coating composition because the polymers are extremely reactive with the curing agents and, therefore, become too viscous if they are stored for any length of time. The curing agents which have been used to cure the epoxide resins are the primary aromatic and aliphatic amines or a polyamide type additive. The polyurethane and epoxide systems then have always been used as two-component systems.

It is an object of the invention to provide a one-component polyurethane coating composition. It is a further object to provide a method for producing a storable, stable one-component polyurethane coating. A further object is to provide a storage stable one-component polyurethane primer composition. A more specific object is to provide a polyurethane primer coating composition which can be prepared and stored for an appreciable period of time before it is used in coating a substrate such as, for example, metals.

Generally speaking, the foregoing objects and others are accomplished in accordance with this invention by providing a process for making a polyurethane primer coating composition in which an organic polyisocyanate, a polyester and an epoxide resin are reacted together in a suitable solvent therefor. It is important to note that the proportions of the compounds containing the hydroxyl groups, i.e. polyesters and epoxide resins, is such that the total number of hydroxyl groups available for reaction with the isocyanate groups of the polyisocyanates is always greater than the total number of isocyanate groups present. Although it has been found that a product having the desired characteristics can be prepared from any suitable organic polyisocyanate, best results have been obtained so far when the polyisocyanate is prepared by reacting a trihydric alcohol, such as, for example, trimethylol propane with tolylene diisocyanates, such as tolylene 2,4-diisocyanate and tolylene 2,6-diisocyanate and mixtures thereof in a ratio of one mol to three mols to produce a triisocyanate. Preferably, about 75 percent epoxide resin and about 25 percent of the polyester-polyisocyanate resin are used. The polyester-polyisocyanate mixture is essentially a 1 to 1 ratio based on the equivalent of the reactive groups.

In general, the invention may be carried out by dissolving the expoxide resin in a suitable solvent therefor and mixing thoroughly with the other components. The resinous condensation products or epoxide resins may be produced by condensing an epihalogenohydrin and a bisphenol i.e. a dihydric phenol according to the method described in U.S. Patent 2,444,333, issued June 28, 1948. One such suitable method of mixing the epoxide resin with the other components, such as the pigments, is to place the components in a mixing means such as a ball mill and tumble the mixture until the pigments are thoroughly dispersed in the carrier medium. If desired, other components such as fillers and the like may also be added to the mixture while milling. After the composition has been tumbled until the components are thoroughly mixed and wetted, the composition is removed from the ball mill. The hydroxyl terminated polyester and a polyisocyanate are then added to the solution and blended. The blending may be carried out by any suitable mixing means, such as, for example, by hand mixing, machine mixing and the like. If desirable, the polyester and polyisocyanate may also be dissolved in a suitable solvent prior to the final blending. After the components have been thoroughly dispersed by a blending means the mixture is then removed from the blending means and is ready for use. The composition may be used immediately as a primer coating or stored as a storage stable coating. The coatings may be applied by any conventional method for coating a surface such as, for example, by spraying, painting, rolling or the like. After the coating is applied to a surface it is allowed to air dry. When the coating has air dried, it provides a very excellent primer coating base. If the coating is used on metal it produces an excellent primer coating to the metal. When applying the coating to metal, for example, care should be taken to insure that the base to which the composition is to be applied is clean. The surface to be clean must be free from grease, oil, dirt, and the like. After the primer coating has dried, a second or top coating may then be applied to the primer base coating. This second coating is an outer or surface coating. The polyurethane base paints are an example of suitable top coating paints which may be used. A surface, such as metal, thus coated has been found to be protected from the more severe forces which tend to destroy painted surfaces. The more severe forces which destroy ordinary painted surfaces are those encountered in sour crude tanks of oil refineries and metal surfaces exposed to salt spray, for example. Also these coatings have been shown to be quite satisfactory for exposure to most chemicals and water.

Any suitable epoxide resin may be used in the invention. Some epoxide resins are known in the trade as "Epon" resins. These resins are produced by condensing epihalogenohydrin, such as, for example, epichlorohydrin with bisphenol-A, which is a bis-(4-hydroxyphenyl) dimethylmethane. The "Epon" resins range from solids to viscous liquids and have molecular weights from about 384 to about 3000. One suitable source of supply for epoxide resins used in the present invention are the "Epon" resins sold by the Shell Chemical Company of New York, N.Y.

Any suitable polyester may be used in the invention.

Examples of such suitable polyesters are the polyesters having terminal hydroxyl groups and having an hydroxyl number of from about 150 to about 300 and having an acid number of about 0, preferably less than about 5 and which are prepared by esterification of a polycarboxylic acid and a polyhydric alcohol. Adipic acid, succinic acid, terephthalic acid, sebacic acid, or any other suitable polycarboxylic acid may be reacted with any suitable polyhydroxy compound to prepare the polyester. The polyhydric alcohol may be a diol, such as, for example, ethylene glycol, diethylene glycol, thioglycol or, in some instances, a trihydric alcohol, such as, for example, glycerol or trimethylol propane, which may be used alone or in admixture with the diols. The polyesters may be linear or branched and may be produced not only from aliphatic carboxylic acids but may be produced from aromatic, saturated or unsaturated polycarboxylic acids, oxycarboxylic acids and dimeric fatty acids and the like by esterification with any suitable polyhydroxy compound.

Any suitable organic polyisocyanate may be reacted with the hydroxyl terminated polyesters and epoxide resins such as, for example, 1,3- and 1,4-phenylene diisocyanate, 2,4- and 2,6-tolylene diisocyanate and mixtures thereof, 1 methyl-3,5-diethyl-2,4-benzene diisocyanate, naphthylene-1,5-diisocyanate, 4,4'-diphenyl-methane diisocyanate, 3,3'-methoxy-4,4'-diphenyl methane diisocyanate, tetramethylene diisocyanate and hexamethylene diisocyanate. The xylene diisocyanate and also diisocyanates containing urea groups such as, for example, the bis-N,N'-(4-methyl-3-isocyanato phenyl)-urea may be used. Polyfunctional isocyanates obtained by reacting polyhydroxy alcohols such as trimethylol propane with an excess of diisocyanates such as tolylene diisocyanate have been found to be preferable. In general, the polyisocyanates of the benzene and naphthalene series or mixtures of these compounds may be employed.

Any suitable solvent may be used in the invention. A suitable solvent must be an organic solvent which does not contain any groups capable of reacting with the epoxide resin, polyester or polyisocyanate. The solvent must also be capable of dissolving the reactants and be able to evaporate when the coating composition is applied to the substrate to be coated. Examples of such suitable solvents are xylene, toluene, Cellosolve acetate, chloroform, ethyl acetate, cyclohexanone, methyl isobutyl ketone, methyl ethyl ketone and mixtures thereof and the like may be used.

Any suitable filler, pigment and the like may also be used in the invention. Here again, the fillers, pigments and the like must be non-reactive with the carrier medium. Suitable fillers and pigments are those which are known and used in the paint industry. Examples of such suitable pigments are the hiding pigments, such as, titanium dioxide, rust inhibiting pigments, such as, zinc chromate, and filler pigments, such as, calcium carbonate mixtures thereof and the like.

In order to better describe and further clarify the invention, the following are specific embodiments thereof.

*Example 1*

About 60 parts of an epoxide rein produced by condensing epichlorohydrin with bisphenol-A in a ratio of about 2:1 and having a molecular weight of about 2000 and an hydroxyl number of from about 300 to about 350 are dissolved in about 40 parts of solvent which is a mixture of about 2 parts Cellosolve acetate to 1 part xylene and 1 part toluene. About 40 parts of this solution which contains about 24 parts epoxide resin is placed in a ball mill and tumbled for about 4 hours with about 104 parts red iron oxide, about 108 parts talc and about 320 parts of a pigment which is a particle having a silica core coated with lead chromate coating, about 5.6 parts of a solution of 50 percent lecithin and 50 percent by weight xylol and about 364 parts of the solvent mixture. After milling, the mixture is removed from the mill and to this mixture is then added about 318 parts of epoxide resin dissolved in a 60:40 ratio with the solvent used above. Also about 37.2 additional parts solvent is added to the reaction mixture. About 37.2 parts of an hydroxyl terminated polyester having an hydroxyl number of from about 205 to about 221 and 46.0 parts of the —NCO terminated reaction product of trimethylol propane and tolylene diisocyanate is added as a 75 percent solution in ethyl acetate and the reaction mixture blended well. After the mixture has been blended well it is then ready to be used or stored.

*Example 2*

About 60 parts of the epoxide resin (Epon 1007) which is produced by condensing epichlorohydrin and bisphenol-A and having a molecular weight of about 4000 and an hydroxyl number of from about 275 to about 325 are dissolved in about 40 parts of a solvent which consists of about two parts methyl ethyl ketone, one part xylene and one part toluene. About 40 parts of this solution containing about 24 parts of epoxide resin are placed in a ball mill with about 104 parts of red iron oxide, about 108 parts talc and about 320 parts of a pigment which is a particle having a silica core coated with lead chromate coating and about 5.6 parts of a solution of 50 percent lecithin and 50 percent by weight xylol is added to the ball mill and the mixture is milled for about four hours. After milling, the mixture is removed from the ball mill and about 318 parts of the above epoxide resin dissolved in a 60:40 ratio with the solvent used above is added to the mixture. Also additional solvent may be added if desired. About 63.2 parts of an hydroxyl terminated polyester having an hydroxyl number of from about 158 to about 175 and about 8.4 parts of a mixture of 2,4- and 2,6-tolylene diisocyanate in a ratio of 80:20 is added to the mixing means and mixed well. The reaction mixture is then removed from the mixing means and used immediately or stored.

*Example 3*

About 40 parts of the epoxide resin (Epon 1001) which is produced by condensing epichlorohydrin and bisphenol-A and having a molecular weight of about 1026 and having an hydroxyl number of from about 400 to about 450 are dissolved in 40 parts of a solvent which consists of about two parts methyl isobutyl ketone, one part xylene, and one part toluene. About 40 parts of this solution which contains about 24 parts epoxide resin are placed in a ball mill with about 104 parts red iron oxide, about 108 parts talc and about 320 parts of a pigment which is a particle having a silica core covered with a lead chromate coating and about 5.6 parts of a solution of 50 percent lecithin and 50 percent by weight xylol is added to the ball mill and the mixture is milled for about four hours. After milling the mixture is removed from the ball mill and about 318 parts of the above epoxide resin dissolved in a 60:40 ratio with the solvent used above is added to the mixture. Also additional solvent may be added if desired. About 42.2 parts of an hydroxyl terminated polyester having an hydroxyl number of from about 280 to about 297 and about 27.2 parts of 2,4-tolylene diisocyanate are added to the mixture and the entire composition is blended for about five minutes. After blending the primer is ready for use or to be stored until needed.

*Example 4*

About 40 parts of the epoxide resin (Epon 828) which is produced by condensing epichlorohydrin and bisphenol-A and having a molecular weight of about 384 and having an hydroxyl number of from about 680 to about 720 are dissolved in 40 parts of a solvent which consist of about two parts Cellosolve acetate, one part xylene, and one part toluene. About 40 parts of this solution which contains about 24 parts epoxide resin are placed in a ball mill with about 104 parts red iron oxide, about 108 parts talc and about 320 parts of a pigment which is a particle having a silica core covered with a lead chromate coating and about 5.6 parts of a solution of 50 percent lecithin and 50 percent by weight xylol is added to the ball mill and the mixture is milled for about four hours. After milling, the mixture is removed from the ball mill and about 312 parts of the above epoxide resin dissolved in a 60:40 ratio with the solvent used above is added to the mixture. Also additional solvent may be added if desired. About 40.5 parts of an hydroxyl terminated polyester having an hydroxyl number of from about 158 to about 175 and about 47 parts of the —NCO terminated reaction product of trimethylol propane and tolylene diisocyanate is added as a 75 percent solution in ethyl acetate and the mixture is blended well. After blending the composition is ready to be used or stored.

*Example 5*

The polyurethane primer composition produced according to Example 1 is applied to an unpainted steel hull of a ship. The primer is applied by spraying and allowed to air dry. After the primer has dried, a top coat of a polyurethane base paint is then applied to produce a protective coating to said steel hull. The polyurethane primer compositions may be applied to any base needing a primer coating such as, for example, steel, concrete and the like.

It is to be understood that any of the organic polyisocyanates or polyesters or epoxide resins or solvents or auxiliary compounds disclosed as operable herein can be substituted in the foregoing working examples for the specific compounds set forth therein.

Although the invention has been described in considerable detail in the foregoing examples for the purpose of illustration, it is to be understood that such detail is solely for this purpose and that variations can be made therein by those skilled in the art without departing from the spirit and scope of the invention as set forth in the claims.

I claim:
1. A polyurethane coating composition which is prepared by reacting an epoxide resin obtained by a process which comprises condensing a mixture consisting essentially of an epihalogenohydrin and a dihydric phenol, said epoxide resin having a molecular weight from about 384 to about 4000 and an hydroxyl terminated polyester obtained by a process which comprises esterification of a polycarboxylic acid with a polyhydric alcohol having an hydroxyl number of from about 150 to about 300 with less than enough organic polyisocyanate, said organic polyisocyanate being the —NCO terminated reaction product of trimethylol propane and tolylene diisocyanate, to react with all the available —OH groups present, in the presence of a suitable inert organic solvent therefor.

2. The polyurethane coating composition of claim 1 wherein said dihydric phenol is bis-(4-hydroxphenyl) dimethylmethane.

References Cited in the file of this patent
UNITED STATES PATENTS

| | | |
|---|---|---|
| 2,621,166 | Schmidt et al. | Dec. 9, 1952 |
| 2,799,663 | Hampton et al. | July 16, 1957 |
| 2,830,965 | Ott | Apr. 15, 1958 |

FOREIGN PATENTS

| | | |
|---|---|---|
| 164,533 | Australia | Aug. 10, 1955 |